United States Patent [19]

Pastwa et al.

[11] Patent Number: 5,045,654
[45] Date of Patent: Sep. 3, 1991

[54] SWITCH ASSEMBLY

[75] Inventors: Conrad M. Pastwa, W. Chicago; Richard L. Lauritsen, Hoffman Estates, both of Ill.

[73] Assignee: Eaton Corporation, Cleveland, Ohio

[21] Appl. No.: 450,896

[22] Filed: Dec. 14, 1989

[51] Int. Cl.$^5$ .............................................. H01H 1/00
[52] U.S. Cl. ................................... 200/291; 200/16 A; 200/553; 200/557; 200/563
[58] Field of Search ............... 200/553, 556, 557, 561, 200/562, 563, 291, 339, 16 R, 16 A

[56] References Cited

U.S. PATENT DOCUMENTS

| 1,888,444 | 11/1931 | Batcheller | 200/277.2 |
| 3,053,337 | 9/1962 | Prohaska et al. | 200/563 X |
| 3,679,846 | 7/1972 | Dillon et al. | 200/556 |
| 4,145,586 | 3/1979 | Swann | 200/67 |
| 4,590,344 | 5/1986 | Kikta et al. | 200/291 |
| 4,740,661 | 4/1988 | Nishikawa et al. | 200/563 |
| 4,772,768 | 9/1988 | Nukada | 200/339 |
| 4,803,317 | 2/1989 | Sutoh et al. | 200/438 |
| 4,904,833 | 2/1990 | Sato et al. | 200/553 |

FOREIGN PATENT DOCUMENTS 1084341  6/1960  Fed. Rep. of Germany ...... 200/563

Primary Examiner—Henry J. Recla
Assistant Examiner—Glenn T. Barrett
Attorney, Agent, or Firm—R. A. Johnston

[57] ABSTRACT

A switch assembly having a pair of spaced parallel contact strips disposed in a housing with integral connector terminal portions thereof extending exteriorly of the housing. One of the contact strips serves as common bus and the other is divided into discrete individual contact portions and has surface portions thereof configured to provide detents integrally therewith. A wiper member bar is pivoted on the housing and has a shorting bar thereon spring biased against the contact strips to effect a switching action as the bar is moved along the strips.

6 Claims, 4 Drawing Sheets

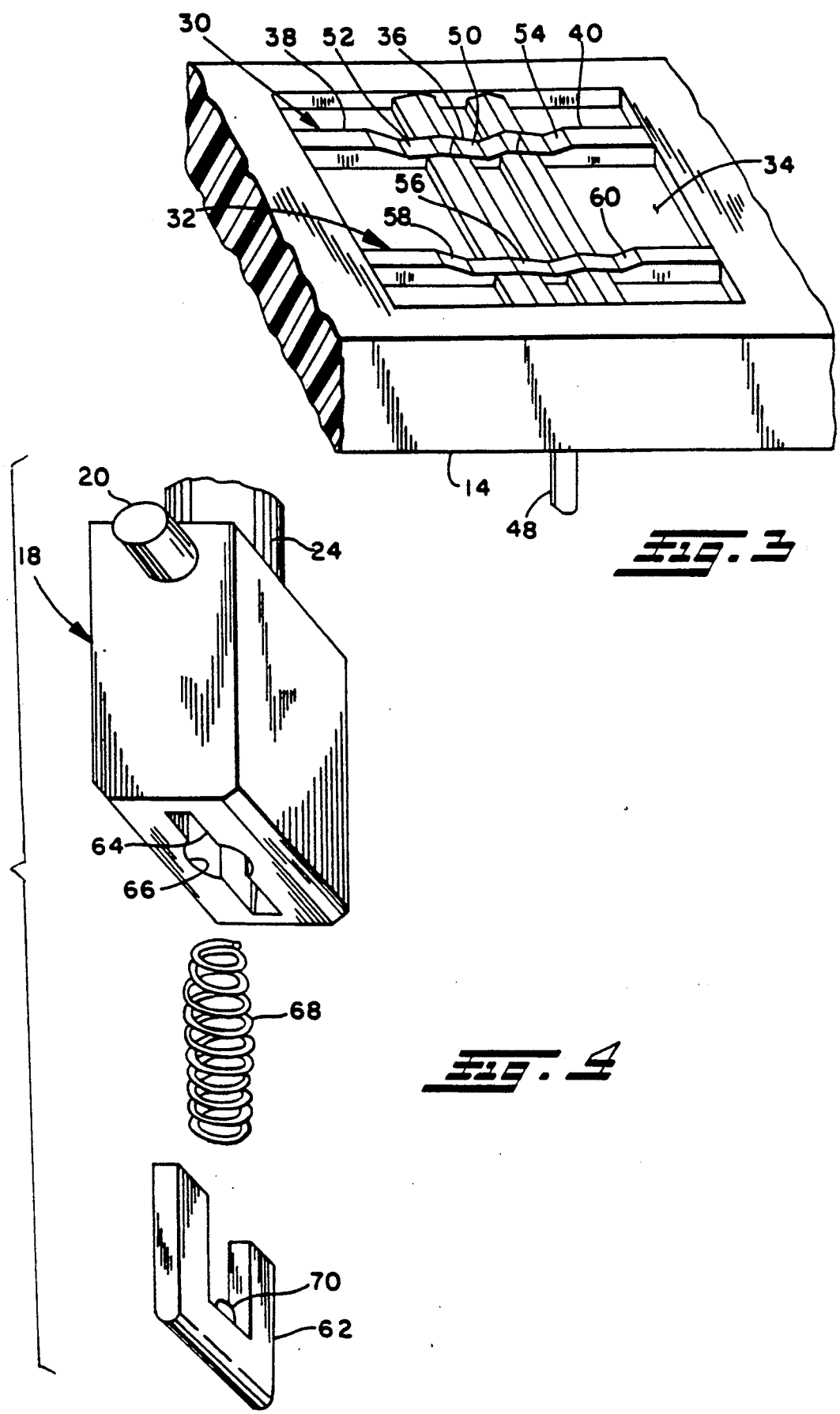

SWITCH ASSEMBLY

BACKGROUND OF THE INVENTION

The present invention relates to electrical switches of the type employed for low voltage switching of power for remotely controlling functions and in particular for remotely controlling accessories in automotive applications. Switches of this type are typically employed for operating automotive door window lift motors and for remotely controlling motors used to adjust rearview mirrors and for automotive power seat adjustments. In such automotive motor switching applications it is common to utilize single pole double throw switches for motor reversing where two-way motor operation is required to provide the desired accessory function.

In automotive applications for accessory functions which require remote control of low voltage motors and further require reversing of such motors, it has been found desirable to provide a positive tactilely sensed detent action to the switch actuation, particularly in applications where it is desired to have the motor continue running in the energized direction upon the operator releasing manually applied pressure to the switch. This type of switch actuation has been found particularly desirable for the "express down" mode of operation for automotive window lift motors.

Typically automotive accessory control switches are of the rocker type but may also be of the type having the actuator configured as a toggle lever depending upon the particular vehicle designer's requirements. It has therefore been desired to provide such a positive tactilely sensed or detent action to the switch of the rocker or toggle type employed for automotive accessory applications and to provide such a switch that is reliable, easily manufactured and carrying the desired motor current at the low voltages encountered in automotive applications.

SUMMARY OF THE INVENTION

The present invention provides a unique and novel, easily manufactured, yet reliable switch.

One embodiment of the design is a multi-position selector switch for low or high current, low voltage circuits. The switch may provide multiple accessory modes (low, medium, high) or allow a single control unit to perform the function of several control units (left mirror, seat, right mirror) with the aid of a separate electronic or relay switching circuit.

An internal detent feature enables the switch to remain in any one of several function modes upon release by the operator of the manually applied operating force.

The switch assembly of the present invention employs a pair of spaced parallel contact strips disposed in a base portion of a housing with portions of the strips extending externally of the housing to thereby provide external electrical connector terminals. Each of the conductor strips has auxiliary surfaces formed thereon for providing detent action to a shorting bar or wiper which is moved along the strips to provide the switching action. The shorting bar is slidably received in an actuator member pivoted on the housing; and, the shorting bar is spring biased against the contact strips.

A single pair of strips is arranged to have one strip continuous to provide a common or bus terminal. The parallel strip adjacent the bus has a pair of discontinuities therein to provide three longitudinally spaced segments each having a terminal portion extending exteriorly of the housing and adapted for external connection thereto. Each of the segments has auxiliary surfaces defining a detent therein. Corresponding detent auxiliary surfaces are provided in the common or bus strip and disposed beside those in he adjacent strip.

A second embodiment of the design provides a switch suitable for remotely controlling reversible operation of relatively low or high current, low voltage devices such as electronically or directly controlled automotive accessory motors. An internal detent ramp provides electrical contact in either direction and returns to a neutral center position upon release by the operator of the manually applied operating force.

Two pairs of spaced parallel strips are arranged to be contacted by the shorting bar as the actuating lever is moved. Each pair of strips has the inboard strip thereof provided with a discontinuity therein to form two longitudinally spaced segments, with each segment having a terminal portion extending exteriorly of the housing for external connection thereto. The remaining outboard strips of each pair are continuous and provide a common or bus terminal therefor. The terminal strip arrangement of the second embodiment thus provides oppositely disposed and oppositely arranged switches with respect to the actuator, to thereby provide a pair of single pole single throw switches each having a bus connected electrically common terminal therebetween and thus operative for motor reversing.

The present invention thus provides a unique and novel switching arrangement effective for remotely controlling reversing of a low voltage direct current motors and is particularly suitable for automotive applications. The switch of the present invention provides tactilely discernable detent action when moved from the neutral to actuated position. The detent is provided by a steep ramp on the edge of spaced parallel contact strips over which a shorting bar is traversed by pivotal movement of an actuator member with the shorting bar slidably received in the actuator and spring biased against the edge of the contact strips.

BRIEF DESCRIPTION OF THE DRAWINGS

FIG. 3 is a somewhat perspective view of the terminal base of FIG. 1 with the upper housing portion removed;

FIG. 4 is an exploded isometric view of the pivoted actuator of FIG. 1;

DETAILED DESCRIPTION

Figure 1:
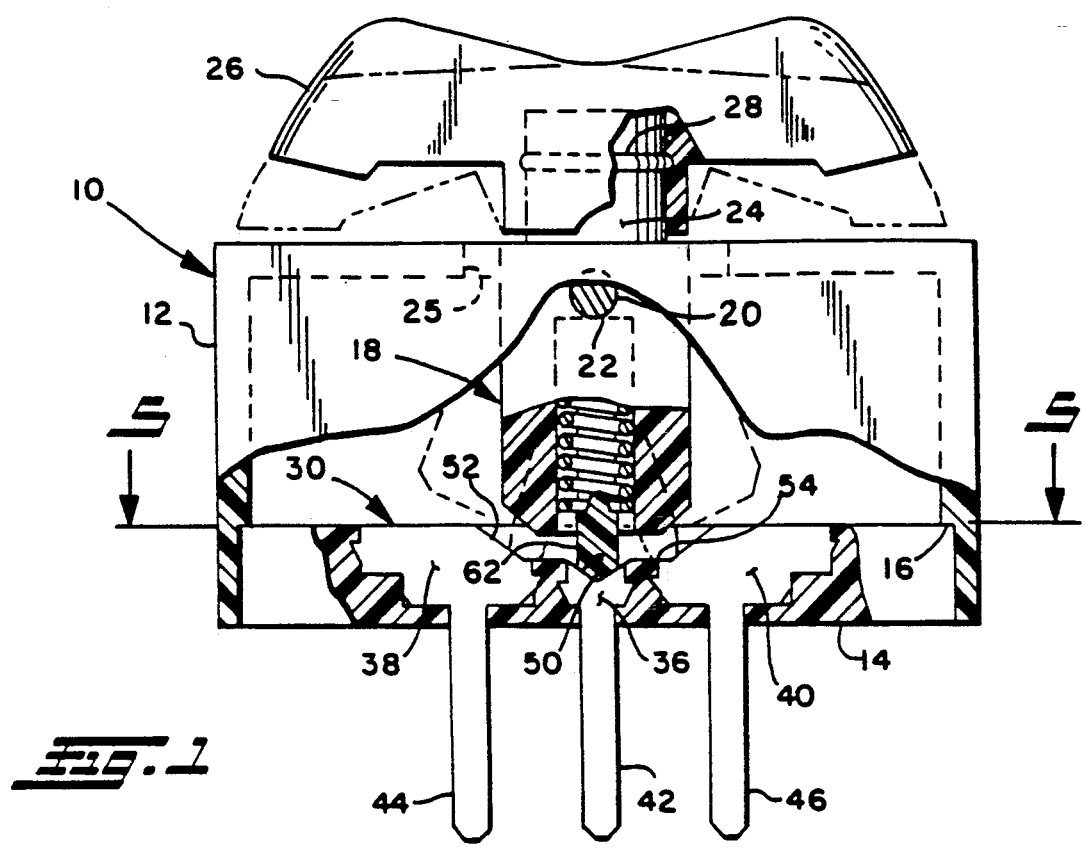
FIG. 1 is a side view of the switch assembly of the present invention with portions of the housing broken away to expose the interior components thereof.

Referring to FIGS. 1, 2, 3 and 4, the switch assembly indicated generally at 10 has a housing means comprising a cover 12 and base 14 both having a generally rectangular configuration with the cover 12 having the base received in a shouldered cutout 16 provided about the periphery of the open end of the cover 12.

An actuator member indicated generally at 18 has a pair of oppositely disposed lugs or trunnions, one of which is illustrated and denoted at 20, extending therefrom. The trunnions are received in a pair of oppositely disposed apertures, one of which is illustrated and denoted by reference numeral 22 in FIG. 1. The actuator member has an upwardly extending lever-portion 24 which extends outwardly through an aperture 25 formed in the upper surface of the cover 12.

A rocker member 26 is received over the actuator lever portion 24 and retained thereon by frictional engagement provided by any suitable means, as, for example, rib 28 formed in the actuator upper portion 24. Although a rocker has been shown installed on the actuator lever 24, it will be understood that alternatively a toggle lever member (not shown) may be installed thereon in place of the rocker in a manner well known in the art.

Referring to FIG. 3, one embodiment of the base 14 is illustrated wherein a pair of spaced parallel conductor strips indicated generally at 30, 32 are disposed in a recess 34 provided in the upper surface of the base 14. The terminal strip 30 is divided at two locations on opposite sides of its mid length and formed into three segments denoted by reference numeral 36 for the center segment and numerals 38, 40 for the end segments as shown in FIGS. 1 and 3.

Figure 2:
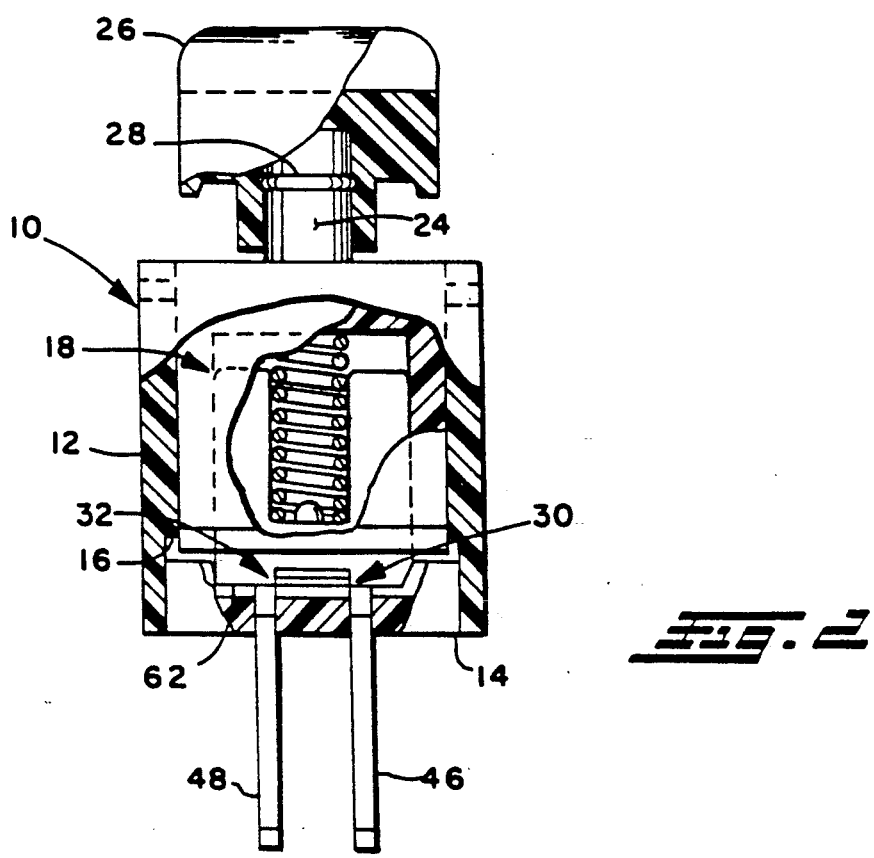
FIG. 2 is a left end view of FIG. 1 with portions of the housing broken away.

Each of the segments 36, 38, 40 has respectively a connector terminal portion denoted respectively by reference numerals 42, 44, 46 extending through the base 14 and downwardly as illustrated in FIGS. 1, 2 and 3. The common or bus strip 32 is continuous along its length and has formed integrally therewith and extending downwardly and outwardly through the base 14 a terminal portion 48 adapted for external electrical connection thereto.

Terminal strip 30 has a plurality of detents formed therein with one detent being formed in each segment and denoted respectively by reference numerals 50, 52, 54 in FIGS. 1 and 3. Similarly shaped detent surfaces are formed at corresponding longitudinal stations in the continuous bus strip 32 and are denoted by reference numerals 56, 58, 60 in FIGS. 1 and 3. Detent 56 on the bus 32 is disposed at the midpoint of the bus and beside detent 50 of center segment 36 of strip 30. Detent 58 on bus 32 is disposed beside detent 52 on bus 35; and, detent 60 on strip 32 is disposed beside detent 54 on bus 30.

Referring to FIG. 4, the actuator 18 is shown removed from the housing and disassembled wherein the generally U-shaped shorting bar 62 is removed from the rectangular cavity 64 provided in the underside of the actuator 18. The cavity 64 has an enlarged cylindrical center section 66 configured to receive a suitable compression spring 68 which has its lower end registered over a lug 70 provided in the closed end of the U-shaped shorting bar 62 such that the spring is retained in registration therewith. The upper end of the spring 68 registers against the closed end of cavity 64 for urging shorting bar 62 in a downward direction against the terminal strips 30, 32.

In operation, the switch actuator 18 and rocker 26 are normally in any of three desired positions. A center position is shown in solid outline in FIG. 1 wherein the lower end of shorting bar 62 rests in the detent surfaces 50, 56 of the terminal strips 30, 32. Upon clockwise movement of actuator 18 about the trunnions 20, to a position indicated in dashed outline in FIG. 1, the shorting bar 62 is moved to contact the detent surfaces 52, 58 respectively, in the terminal segment 38 and strip 32 for making a circuit therebetween and between connector terminals 48 and 44. Upon counterclockwise rotation of actuator 18 about trunnion 20, to the position indicated in dashed outline in FIG. 1, shorting bar 62 is registered against the detent surfaces 54, 60 and completes a circuit between the terminal strip segment 40 and bus bar 32 and between electrical terminals 48 and 46.

Figure 5:
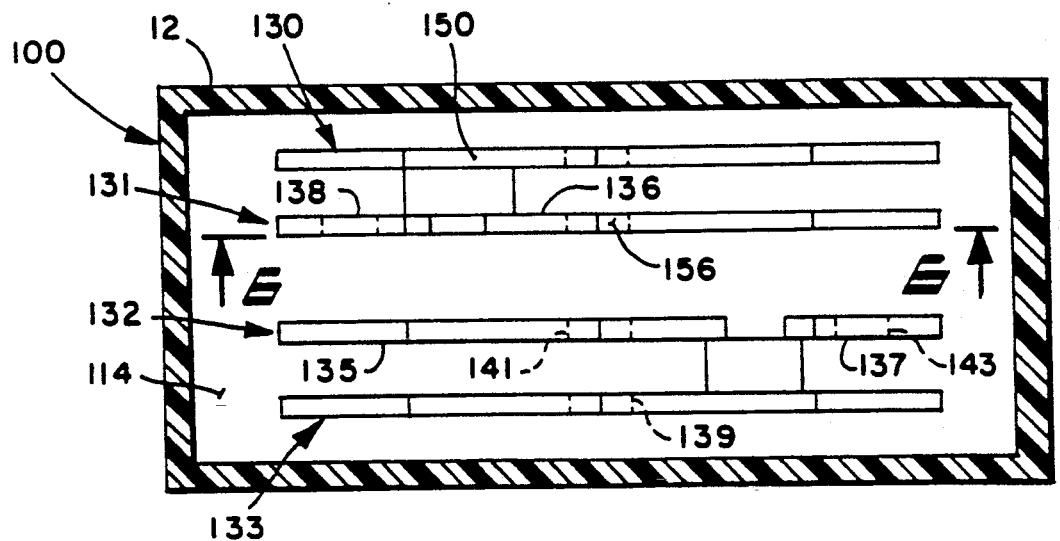
FIG. 5 is a section view taken along section-indicating lines 5—5 of FIG. 1 and illustrates an alternative embodiment of the switch.
Figure 6:
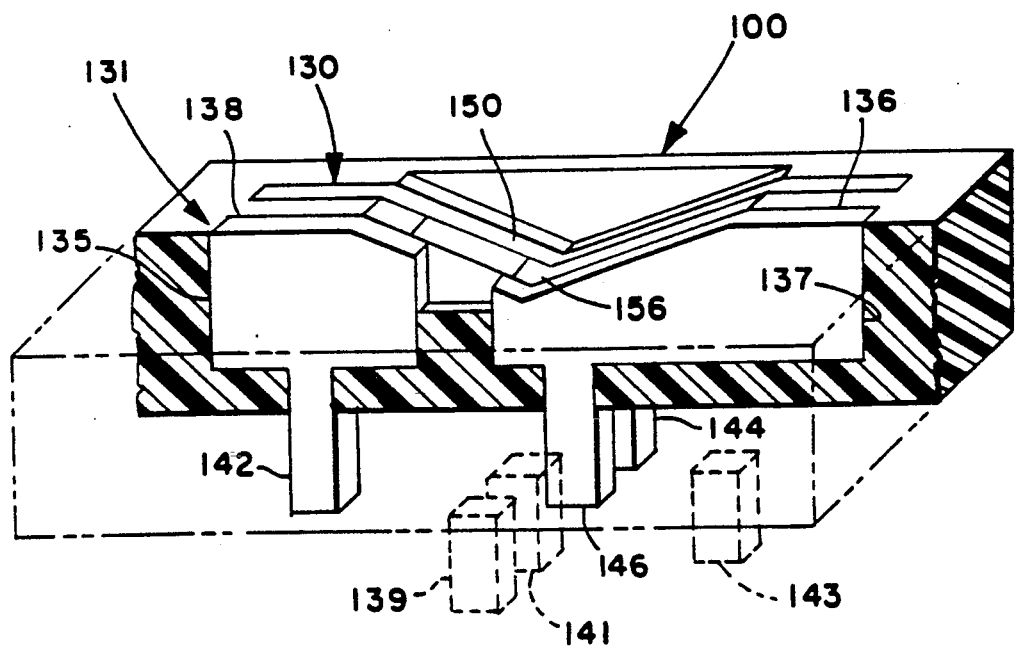
FIG. 6 is an isometric view of a section taken along section-indicating lines 6—6 of FIG. 5; and, FIG. 7 is an exploded isometric view of the pivoted actuator of the embodiment of FIG. 5.
Figure 7:
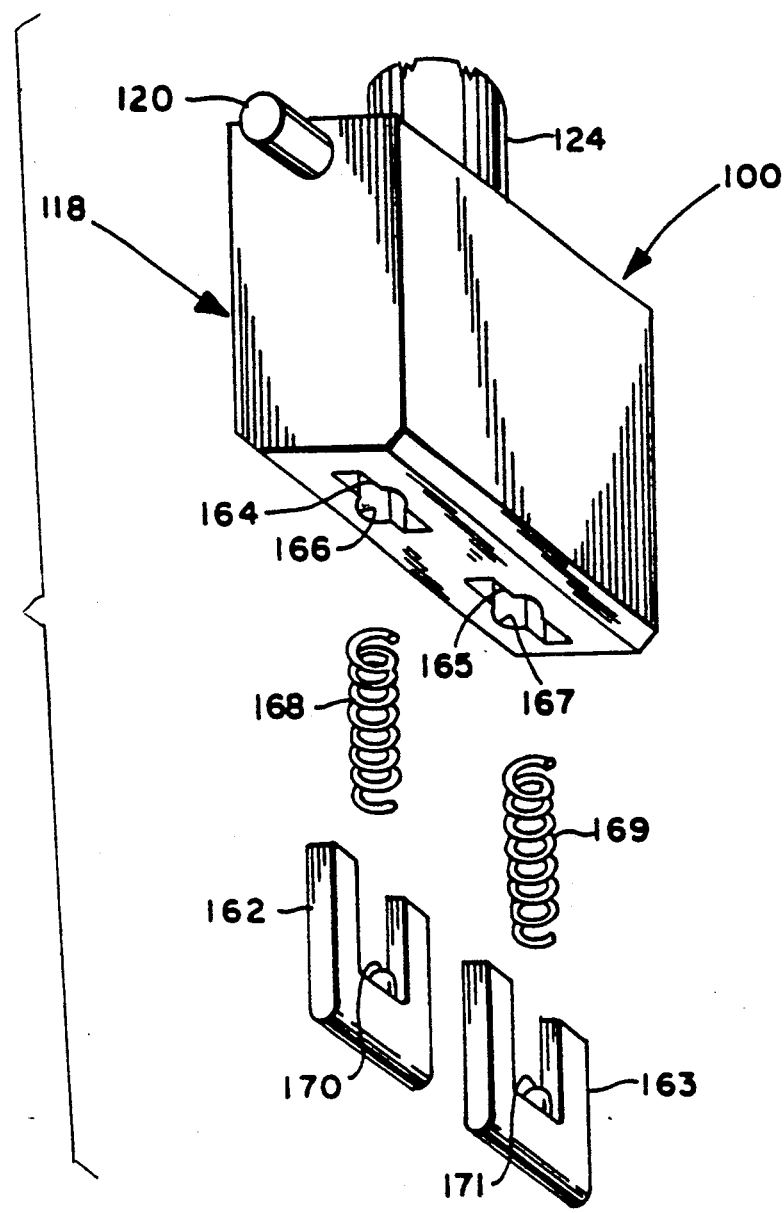

Referring to FIGS. 5, 6 and 7, an alternate embodiment of the switch 100 is shown having a base 114 in which two pairs of terminal strips, indicated generally at 130 and 131, and are disposed in spaced generally parallel arrangement with inboard strip 131 being divided into separate segments 136, 138.

A separate pair of terminal strips indicated generally at 132, 133 is provided with the inboard strip 132 divided into separate longitudinal segments denoted by reference numerals 135, 137 which are separated by a space or discontinuity disposed oppositely on the opposite side of the mid-length thereof from the discontinuity between the inboard terminal segments 138, 136 of strip 131.

The terminal strip 130 has formed integrally therewith an electrical connector terminal 144 which extends downwardly through base 114 and exteriorly of the housing. Each of the segments 136, 138 of terminal strip 131 also has an integral electrical connector terminal denoted respectively by reference numerals 142, 146 formed thereon and extending downwardly through base 114. The continuous terminal strip 133 also has an electrical connector terminal formed integrally therewith and extending downwardly through base 114 which terminal is denoted by dashed outlines and reference numeral 139 in the drawings. The segments 135, 137 of strip 132 similarly have electrical connector terminals extending downwardly therefrom as denoted respectively by reference numerals 141, 143 and shown in dashed outline in FIGS. 5 and 6.

Referring to FIG. 7, the actuator employed with the embodiment of FIGS. 5 and 6 is indicated generally at 118 and has a pair of oppositely disposed trunnions one of which is illustrated at 120. The actuator 118 has an upwardly extending lever portion 124 and has a pair of spaced cavities 164, 165 formed in the bottom thereof with each cavity having an enlarged cylindrical center portion indicated at 166, 167. A pair of generally U-shaped shorting bars denoted respectively 162, 163 are slidably received respectively in the cavities 164, 165. Each of the shorting bars 162, 163 has a registration lug denoted at 170, 171 respectively provided in the closed end of the U-shape and has received thereover the lower end of a compression spring denoted respectively 168, 169 which has its upper end registered against the closed end of the cavity in the actuator and functions to bias the shorting bar downwardly into contact with the conducting strips. It will be understood that the shorting bar 162 is registered against contact strips 132, 133; and, the shorting bar 163 is registered against the contact strips 130, 131.

Referring to FIGS. 5 and 6, each of the shorting bars 130, 131, 132 and 133 has a detent formed in the mid length thereof as illustrated typically for the strips 130 and 131 in FIG. 6 and denoted by reference numerals 150, 156.

In operation, as the actuator 118 is moved from the neutral or center position clockwise about the trunnions 120, the shorting bar 163 is moved across strips 130, 131 to make contact between the common bus strip 130 and the segment 138 for effecting a circuit between connector terminals 144 and 142. Upon rotation of the actuator 118 in a counterclockwise direction about trunnions 120 the shorting bar 162 is moved along the strips 132, 133 and makes contact between the segment 137 and the strip 133 thereby completing a circuit between connector terminals 143 and 139. It will be understood that the strips 130 and 133 are an electrically common or act as a bus. With the actuator in the neutral position connector terminals 144 and 146 are connected in circuit by shorting bar 163; and, separately terminals 141 and 139 are in circuit by shorting bar 162.

The present switch assembly thus provides a unique and novel switch for switching low voltage relatively high current loads such as encountered in automotive applications for remotely reversing low voltage direct current motors. The switch described hereinabove employs a shorting bar or wiper traversing spaced parallel contact strips which have the detent surfaces formed integrally therein thereby providing a tactilely discernable detent action and further have integrally formed connecting terminals extending therefrom outwardly through the switch casing. The present invention thus provides an easily manufactured and inexpensive reliable switch assembly for automotive applications requiring switching of substantial current at low voltage and particularly for reversing rotation of accessory motors.

We claim:

1. An electric switch assembly comprising:
   (a) housing means;
   (b) an actuator lever means disposed for movement between first and second positions about a pivot on said housing, said lever having first portions thereof extending exteriorly of said housing means and second portions thereof disposed interiorly of said housing means;
   (c) movable contact means mounted on said second portions of said lever means and movable therewith;
   (d) a pair of contact strips disposed interiorly of said housing means in spaced generally parallel arrangement, one of said strips is a common bus and the other has a discontinuity therealong dividing said strip into plural electrically separate segments, said one strip and said segments having integrally formed therewith terminal means extending exteriorly of said housing means, said strips further having formed integrally therewith auxiliary surfaces at a common station therealong; and movement of said actuator lever means alternately between said first and second positions causes said movable contact means to alternately make a circuit between said bus and one of said segments, wherein said auxiliary surfaces provide detent action for said contact means.

2. The switch defined in claim 1, wherein said stationary contact means comprises plural pairs of contact strips disposed in generally spaced parallel arrangement; said movable contact means includes a separate contact member bridging between each of said pairs of contact strips for making and breaking a separate circuit associated with each pair; and, said first position comprises a central station along said strips in which position each of said separate circuits is broken, said actuator lever means selectively movable in opposite directions from said central position for alternately completing said separate circuits.

3. The switch defined in claim 1, wherein said lever means first portions have a toggle-type configuration.

4. The switch defined in claim 1, wherein said lever means first portions have a rocker-type configuration.

5. The switch assembly defined in claim 1, wherein one of said strips is a common bus and the other includes two spaced discontinuities forming three electrically separate segments therealong.

6. The switch assembly defined in claim 1, wherein said actuator means has a center position intermediate said first and second positions and said auxiliary surfaces provide contact detent action for said center position.

* * * * *